United States Patent [19]

Alagna

[11] Patent Number: 5,180,017

[45] Date of Patent: Jan. 19, 1993

[54] HORSESHOE HAVING REPLACEABLE HORSESHOE PAD

[76] Inventor: Samuel M. Alagna, 1718 Brentwood, Troy, Mich. 48089

[21] Appl. No.: 754,031

[22] Filed: Sep. 3, 1991

[51] Int. Cl.⁵ .............................. A01L 1/04; A01L 5/00
[52] U.S. Cl. .......................................... 168/12; 168/29; 168/38; 168/DIG. 1
[58] Field of Search ................. 168/11, 12, 23, 29, 168/38, DIG. 1

[56] References Cited

U.S. PATENT DOCUMENTS

| | | | |
|---|---|---|---|
| 102,504 | 5/1870 | Copeland | 168/38 |
| 289,402 | 12/1883 | Fenno | 168/11 |
| 301,721 | 7/1884 | Jaffray | |
| 537,390 | 4/1895 | Moloney | |
| 610,212 | 9/1898 | Whitaker | 168/29 |
| 626,091 | 5/1899 | Peter et al. | 168/12 |
| 642,573 | 2/1900 | Bemont | |
| 3,603,402 | 9/1971 | McDonnell | 168/12 |
| 4,207,947 | 6/1980 | Cope et al. | 168/29 |
| 4,690,222 | 9/1987 | Cameron | 168/4 |
| 4,760,885 | 8/1988 | Benning | 168/11 |
| 4,881,600 | 11/1989 | Nebel | 168/11 |

FOREIGN PATENT DOCUMENTS 212795 3/1924 United Kingdom .................. 168/12

*Primary Examiner*—Robert P. Swiatek
*Attorney, Agent, or Firm*—Basile & Hanlon

[57] ABSTRACT

A replaceable horseshoe pad is disclosed for use with a shoe plate. The horseshoe pad comprises a cushioning sole plate and a plurality of ground contacting cleat-like members each jointed to, and extending outwardly from the sole plate. The cleat-like members are adapted to extend through corresponding cleat receiving apertures formed in the shoe plate. The invention further comprises a mechanism for securing the sole and shoe plates to a horse's hoof.

13 Claims, 2 Drawing Sheets

HORSESHOE HAVING REPLACEABLE HORSESHOE PAD

BACKGROUND OF THE INVENTION

1. Field of the Invention

The present invention relates generally to horseshoes, and more particularly to a horseshoe having a replaceable horseshoe pad having ground contacting cleat-like members extending outwardly therefrom.

2. Description of the Relevant Art

Those familiar with the handling of horses are well aware of the need for a new and improved horseshoe. Since the legs of horses, and particularly their tendons, ankles, knees and shoulders, are frequently injured by the shocks incurred from impact of their hooves with relatively hard surfaces, not only must the shoeing of a horse be adequate, but rather it should be of superior quality in order to best protect the horse.

However, due to the expense and labor intensive time involved in buying and customizing a new set of horseshoes as are presently available, a horse owner may be tempted to shoe his horse with a merely adequate or less than adequate horseshoe. For the same reasons an owner will not, in all likelihood, readily change the horse's shoes in order that they be specifically or ideally suited to each type of surface the horse will be walking on.

Thus, it would be desirable to provide a horseshoe wherein the metal shoe plate bears little or none of the horse's weight, thereby saving the customized metal portion from wear and tear, thus necessitating fewer replacements of the metal shoe plate. It would further be desirable to provide a horseshoe which can be easily adapted for different riding surfaces, and which can be manufactured efficiently and at low cost, while at the same time providing superior strength and protection to a horse's leg.

SUMMARY OF THE INVENTION

The problems enumerated above are solved by the present invention which discloses a replaceable horseshoe pad for use with a shoe plate. The horseshoe pad comprises a cushioning sole plate and a plurality of ground contacting cleat-like members each joined to, and extending outwardly from the sole plate. The cleat-like members are adapted to extend through corresponding cleat receiving apertures formed in the shoe plate. The invention further comprises means for securing the sole and shoe plates to a horse's hoof.

BRIEF DESCRIPTION OF THE DRAWINGS

Other objects and features of the invention will become apparent by reference to the following detailed description and to the drawings in which.

DETAILED DESCRIPTION OF THE PREFERRED EMBODIMENTS

Figure 1:
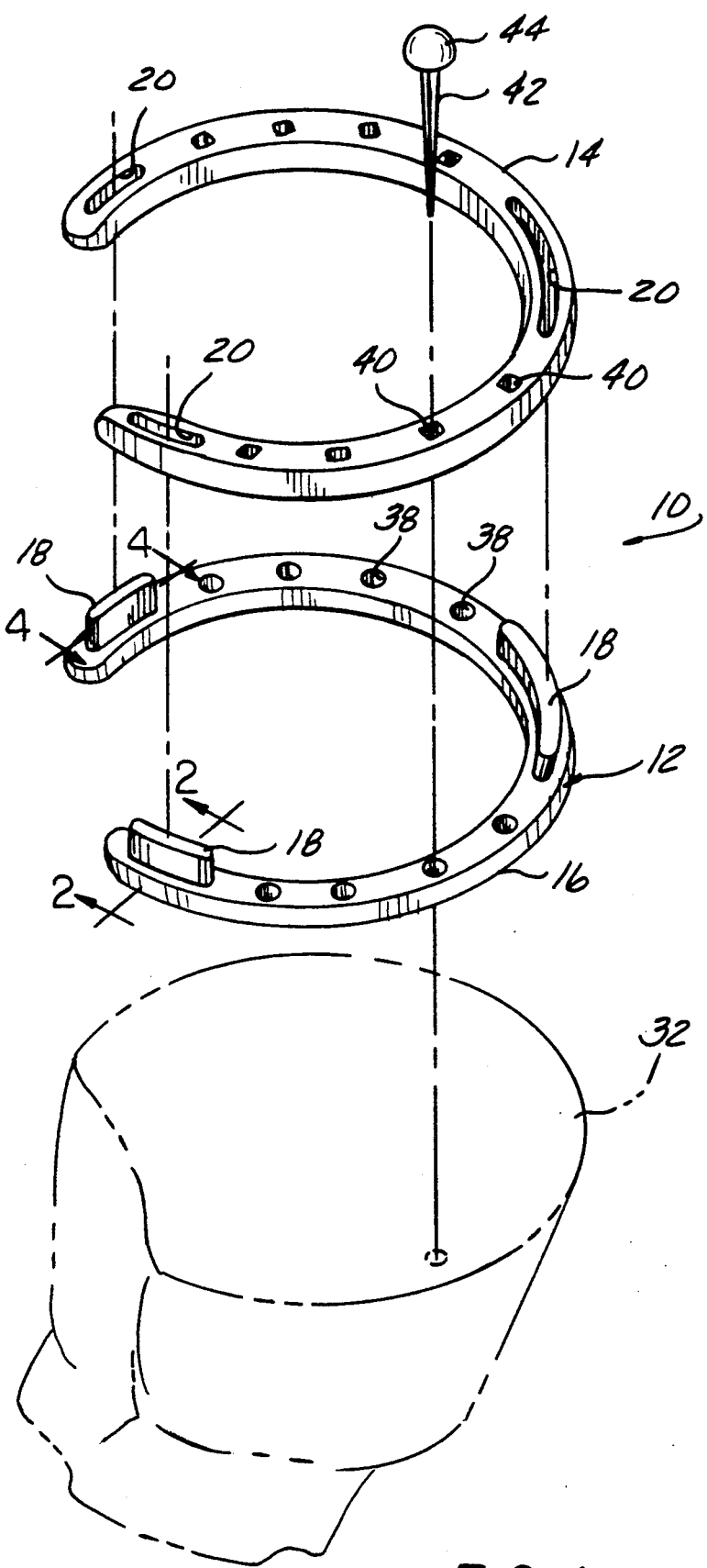
FIG. 1 is an exploded perspective view of the horseshoe of the present invention, showing the shoe plate, the cushioning sole plate, and one polymeric-headed nail, as well as a horses hoof in phantom.
Figure 6:
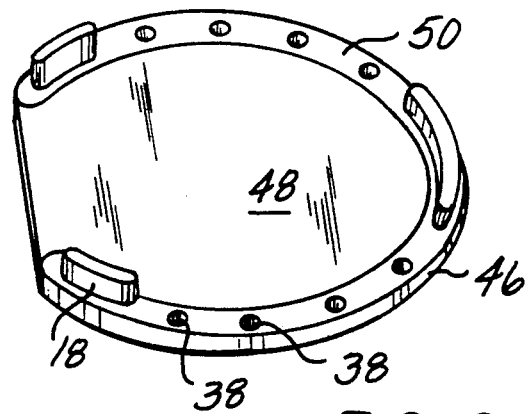
FIG. 6 is a perspective view of a full cushioning sole plate.

Referring now to FIG. 1, the horseshoe of the present invention is designated generally as 10. The horseshoe 10 includes a replaceable horseshoe pad 12 and a shoe plate 14. Horseshoe pad 12 comprises a cushioning sole plate 16 having a plurality of ground contacting cleat-like members 18 each joined to, and extending outwardly from sole plate 16. Cleat-like members 18 are adapted to extend through corresponding cleat receiving apertures 20 formed in shoe plate 14. In addition to the cushioning sole rim plate 16 shown in FIG. 1, an alternate embodiment is the full sole plate 46 shown in FIG. 6. Sole plate 46 is similar to sole plate 16, except for the addition of wall 48 integrally formed with, and extending within rim 50. The advantage of sole plate 46 is that, in environments such as trailriding, wall 48 would prevent any rocks or other debris from striking and injuring the inside of the horse's hoof. Further, when riding in snow, wall 48 will prevent snow from balling up in the hoof. Still further, in any environment, if the hoof is sore for any reason, the rider may use sole plate 46 in order to protect the hoof from coming in contact with any foreign object. It is to be understood throughout the disclosure that descriptions of sole plate 16 apply equally well to sole plate 46.

Replaceable horseshoe pad 12 can be adapted for use with any type of shoe plate 14, including a modified traditional forged type, or a metal stamped plate. Shoe plate 14 may further be formed from a single thin strip of metal, or a suitable polymeric material. The shoe plate 14 should be made in a way and of a suitable material such that horseshoe 10 will not be pulled loose from the horse's hoof 32 when walking through mud or other similar conditions. It is to be understood that, when made from a suitable material, horseshoe pad 12 may be used without any type of shoe plate 14 as long as cleat-like member 18 is made of a material hard enough for endurance but soft enough to keep horseshoe pad 12 from being pulled off in a muddy or similar environment.

Sole plate 16 and cleat-like members 18 may be formed by any suitable means and out of any suitable material. The material for sole plate 16 should be sufficiently cushioning in order to soothe the horse's leg, whereas the material for the cleat-like member 18 must be sufficiently strong and impact resistant in order to support the horse's weight on the particular type of surface the horse will be contacting. In the preferred embodiment, cushioning sole plate 16 and cleat-like members 18 are integrally molded from any suitable polymeric material, such as polyurethane.

The polymeric material used may be molded using a dual or multi-durometer process wherein the sole plate 16 and the cleat-like members 18 are made out of the same material, but with the cushioning sole plate 16 having a first hardness, and the cleat-like members 18 having a second hardness. The second hardness should be at least as great as the first hardness, and in the preferred embodiment, the second hardness is greater than the first hardness.

Figure 2:
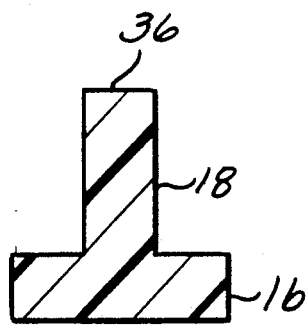
FIG. 2 is a enlarged cross sectional view of a cleat-like member extending outwardly from the sole plate, taken on line 2—2 of FIG. 1.
Figure 3:
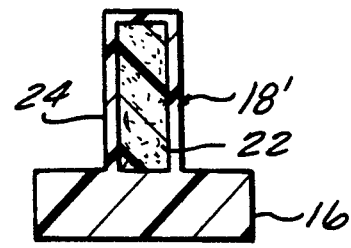
FIG. 3 is an enlarged view similar to FIG. 2, showing an alternate material for the cleat-like member.
Figure 4:
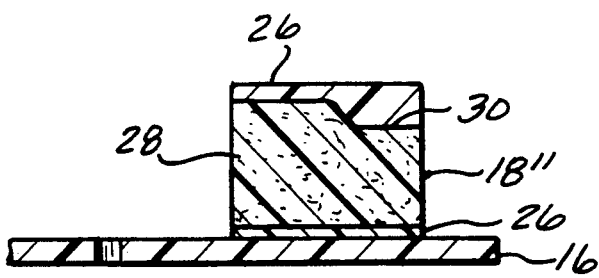
FIG. 4 is an enlarged cross sectional view showing another embodiment of the cleat-like member and taken on line 4—4 of FIG. 1.

Referring now to FIG. 2, there is shown a cross sectional view of cleat-like member 18, wherein cleat-like member 18 and cushioning sole plate 16 are integrally formed from a dual-durometer polymeric material. FIGS. 3 and 4 show alternate embodiments of the cleat-like member. FIG. 3 shows a cleat-like member 18' having a soft, resilient material 22 inside, and a hard, impact resistant material 24 outside. An example of a multi-durometer material is shown in FIG. 4 with cleat-like member 18". This embodiment shows a triple layered cleat having a hard, impact resistant material 26 on the top and bottom of cleat-like member 18", and a soft, opened cell material 28 sandwiched therebetween. In addition, FIG. 4 discloses a stepped portion 30 near the rearward end of cleat-like member 18". Stepped portion 30 may be included for additional wear resistance on cleat-like member 18".

It is to be understood that cleat-like members 18, 18' and 18" may be made from any suitable material, with varying amounts of wear resistance, depending upon the type of surface the horse will come into contact with. For example, in addition to the embodiments described above, the cleat-like members may be made of carbide or of any suitable polymeric material, including those having glass, ceramic or metal powder fillers admixed therein, as well as any other suitable filler. The cleat-like member can thus be customized for whatever the particular environment, whether it be trail or endurance riding, 100 jumper, fox hunting, racing, working horses such as carriage or police horses, or dressage, to name a few. In addition, the material chosen for cleat-like members 18 only needs to remain wear resistant for approximately 6 to 8 weeks, in that, at that time, the horseshoe 10 would need to be removed in order to trim the horse.

Figure 5:
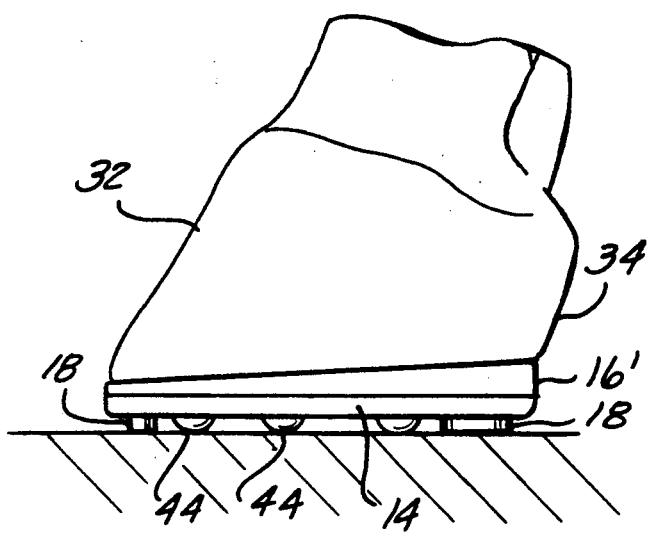
FIG. 5 shows a second embodiment of the cushioning sole plate.

The cleat-like members 18 may also serve a therapeutic purpose in that certain of the cleat-like members may be filed, built-up, or otherwise customized in order to compensate for a particular horse's physical ailment. Another embodiment showing a compensation for a physical deficiency is shown in FIG. 5. There, cushioning sole plate 16, is formed into a wedge shape to compensate for the horse's hoof 32 being irregularly upwardly inclined near the rear 34 of hoof 32.

For better traction, cleat-like members 18 may also have ridges or other suitable designs imprinted on the ground contacting surface 36 of cleat-like member 18. Further, it is to be understood that any number of cleat-like members 18 may be used, according to need, but in the preferred embodiment, three cleat-like members 18 and corresponding cleat receiving apertures 20 are used.

Horseshoe 10 further comprises means for securing the sole plate 16 and shoe plate 14 to the horse's hoof 32. This securing means may comprise any suitable means, but in the preferred embodiment, the securing means comprises a plurality of apertures 38 defined in sole plate 16. A plurality of corresponding apertures 40 are defined in shoe plate 14. A plurality of horseshoe nails 42 are receivable through shoe plate apertures 40, sole plate apertures 38 and the horse's hoof 32, respectively, as best shown in FIG. 1. As shown in FIGS. 1 and 5, a modified horseshoe nail may be used wherein the nail has a polymeric head 44 fixedly attached to the head of nail 42, with the polymeric headed nail being adapted to function as an additional cleat-like member. Thus, the polymeric head 44 should be made out of any suitable polymeric material, as discussed above, which would be able to withstand the force exerted on it by the horse on a particular surface. It is to be understood that any number of nails, either with or without polymeric head 44, may be used as desired or needed.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A replaceable horseshoe pad for use with a shoe plate, the horseshoe pad comprising:
   a cushioning sole plate:
   a plurality of ground contacting cleat-like members each joined to, and extending outwardly from the sole plate, the cleat-like members being adapted to extend through corresponding cleat receiving apertures formed in the shoe plate, wherein the cushioning sole plate and cleat-like members are integrally molded from a multi-durometer polymeric material, with the cushioning sole plate having a first hardness, and the cleat-like members having a second hardness, the second hardness being greater than the first hardness; and
   means for securing the sole and shoe plates to a horse's hoof.

2. The replaceable horseshoe pad as defined in claim 1 wherein the polymeric material is polyurethane.

3. The replaceable horseshoe pad as defined in claim 1 wherein the securing means comprises:
   a plurality of apertures defined in the sole plate;
   a plurality of corresponding apertures defined in the shoe plate; and
   a plurality of horseshoe nails receivable through the shoe plate apertures, the sole plate apertures and the horse's hoof, respectively.

4. The replaceable horseshoe pad as defined in claim 3 wherein at least one of the horseshoe nails has a polymeric head fixedly attached to the nail head, the polymeric headed nail being adapted to function as an additional cleat-like member.

5. The replaceable horseshoe pad as defined in claim 1 wherein there are three cleat-like members and three corresponding cleat receiving apertures.

6. A replaceable horseshoe pad for use with a shoe plate, the horseshoe pad comprising:
   a cushioning sole plate;
   a plurality of ground contacting cleat-like members each joined to, and extending outwardly from the sole plate, the cleat-like members being adapted to extend through corresponding cleat receiving apertures formed in the shoe plate, the cushioning sole plate and cleat-like members being integrally molded from a multi-durometer polymeric material, with the cushioning sole plate having a first hardness, and the cleat-like members having a second hardness, the second hardness being greater than the first hardness; and
   means for securing the sole and shoe plates to a horse's hoof, wherein the securing means comprises:
   a plurality of apertures defined in the sole plate;
   a plurality of corresponding apertures defined in the shoe plate; and
   a plurality of horseshoe nails receivable through the shoe plate apertures, the sole plate and the horse's hoof, respectively.

7. The replaceable horseshoe pad as defined in claim 6 wherein there are three cleat-like members and three corresponding cleat receiving apertures.

8. The replaceable horseshoe pad as defined in claim 7 wherein at least one of the horseshoe nails has a polymeric head fixedly attached to the nail head, the polymeric headed nail being adapted to function as an additional cleat-like member.

9. A horseshoe, comprising:
a shoe plate;
a replaceable cushioning sole plate;
a plurality of ground contacting cleat-like members each joined to, and extending outwardly from the sole plate;
a plurality of cleat receiving apertures formed in the shoe plate, the cleat-like members being adapted to extend through the cleat receiving apertures, wherein the cushioning sole plate and cleat-like members are integrally molded from a multi-durometer polymeric material, with the cushioning sole plate having a first hardness, and the cleat-like members having a second hardness, the second hardness being greater than the first hardness; and
means for securing the sole and shoe plates to a horse's hoof.

10. The replaceable horseshoe pad as defined in claim 13 wherein the securing means comprises:
a plurality of apertures defined in the sole plate;
a plurality of corresponding apertures defined in the shoe plate; and
a plurality of horseshoe nails receivable through the shoe plate apertures, the sole plate apertures and the horse's hoof, respectively.

11. The replaceable horseshoe pad as defined in claim 10 wherein at least one of the horseshoe nails has a polymeric head fixedly attached to the nail head, the polymeric headed nail being adapted to function as an additional cleat-like member.

12. The replaceable horseshoe pad as defined in claim 11 wherein there are three cleat-like members and three corresponding cleat receiving apertures.

13. A horseshoe, comprising:
a shoe plate;
a replaceable cushioning sole plate;
three ground contacting cleat-like members each joined to, and extending outwardly from the sole plate, the cushioning sole plate and cleat-like members being integrally molded from a multi-durometer polymeric material, with the cushioning sole plate having a first hardness, and the cleat-like members having a second hardness, the second hardness being greater than the first hardness;
three cleat receiving apertures formed in the shoe plate, the cleat-like members being adapted to extend through the cleat receiving apertures; and
means for securing the sole and shoe plates to a horse's hoof, wherein the securing means comprises:
a plurality of apertures defined in the sole plate;
a plurality of corresponding apertures defined in the shoe plate; and
a plurality of horseshoe nails receivable through the shoe plate apertures, the sole plate apertures and the horse's hoof, respectively, wherein at least one of the horseshoe nails has a polymeric head fixedly attached to the nail head, the polymeric headed nail being adapted to function as an additional cleat-like member.

* * * * *

UNITED STATES PATENT AND TRADEMARK OFFICE
CERTIFICATE OF CORRECTION

PATENT NO. : 5,180,017

DATED : January 19, 1993

INVENTOR(S) : Sam Alagna

It is certified that error appears in the above-identified patent and that said Letters Patent is hereby corrected as shown below:

On the title page, in the designation of the Inventor, please delete "Samuel M. Alagna, 1718 Brentwood, Troy, Mich. 48089" and insert --Sam Alagna, 42500 Ryan Road, Sterling Heights, Mich. 48314--.

Signed and Sealed this

Fourteenth Day of December, 1993

*Attest:*

BRUCE LEHMAN

*Attesting Officer*     *Commissioner of Patents and Trademarks*